Sept. 22, 1953　　　　　D. METTETAL, JR　　　　　2,653,049
AUTOMOBILE TRANSPORTING VEHICLE WITH ADJUSTABLE TRACK
Filed Dec. 22, 1950　　　　　　　　　　　　　　　　4 Sheets-Sheet 1

INVENTOR.
Donald Mettetal, Jr.
BY
Cromwell, Greist & Warden
Attys.

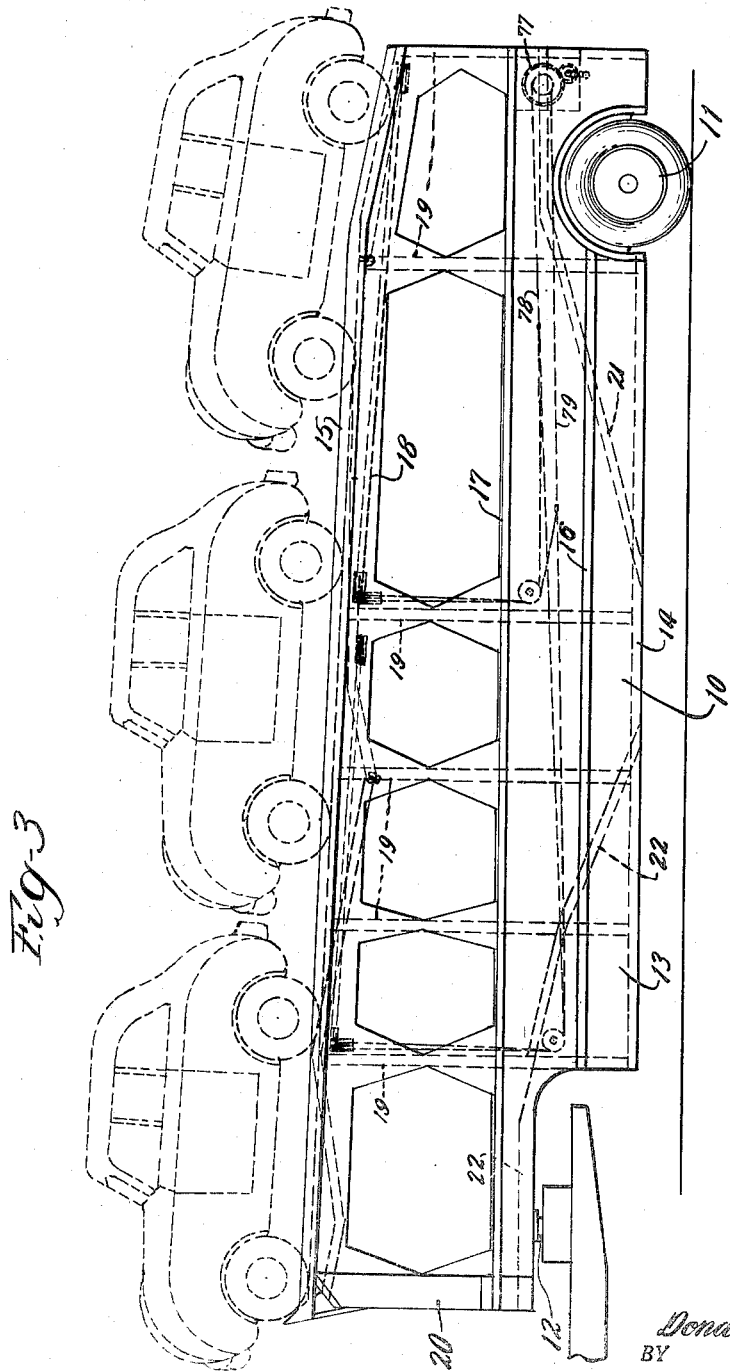

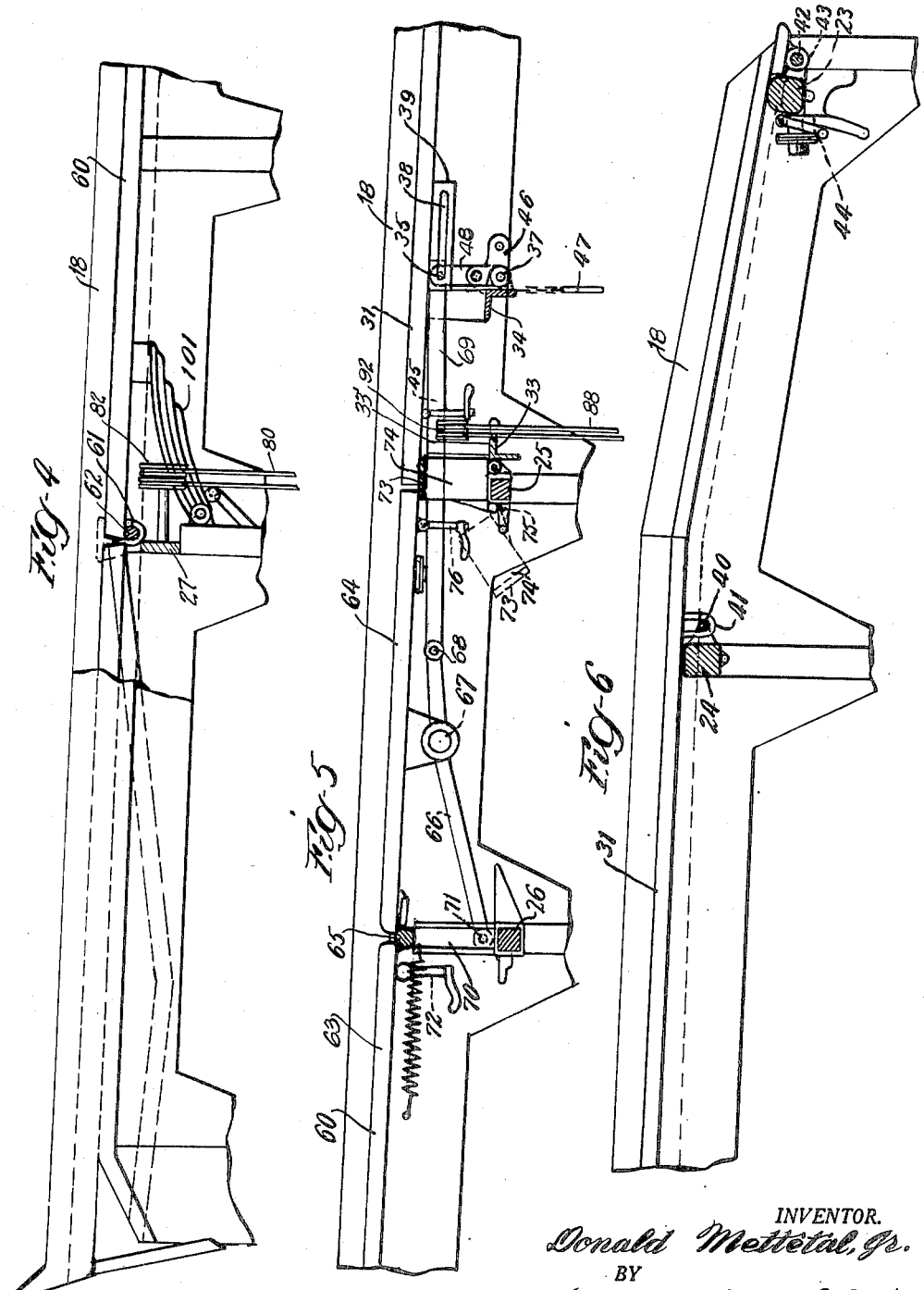

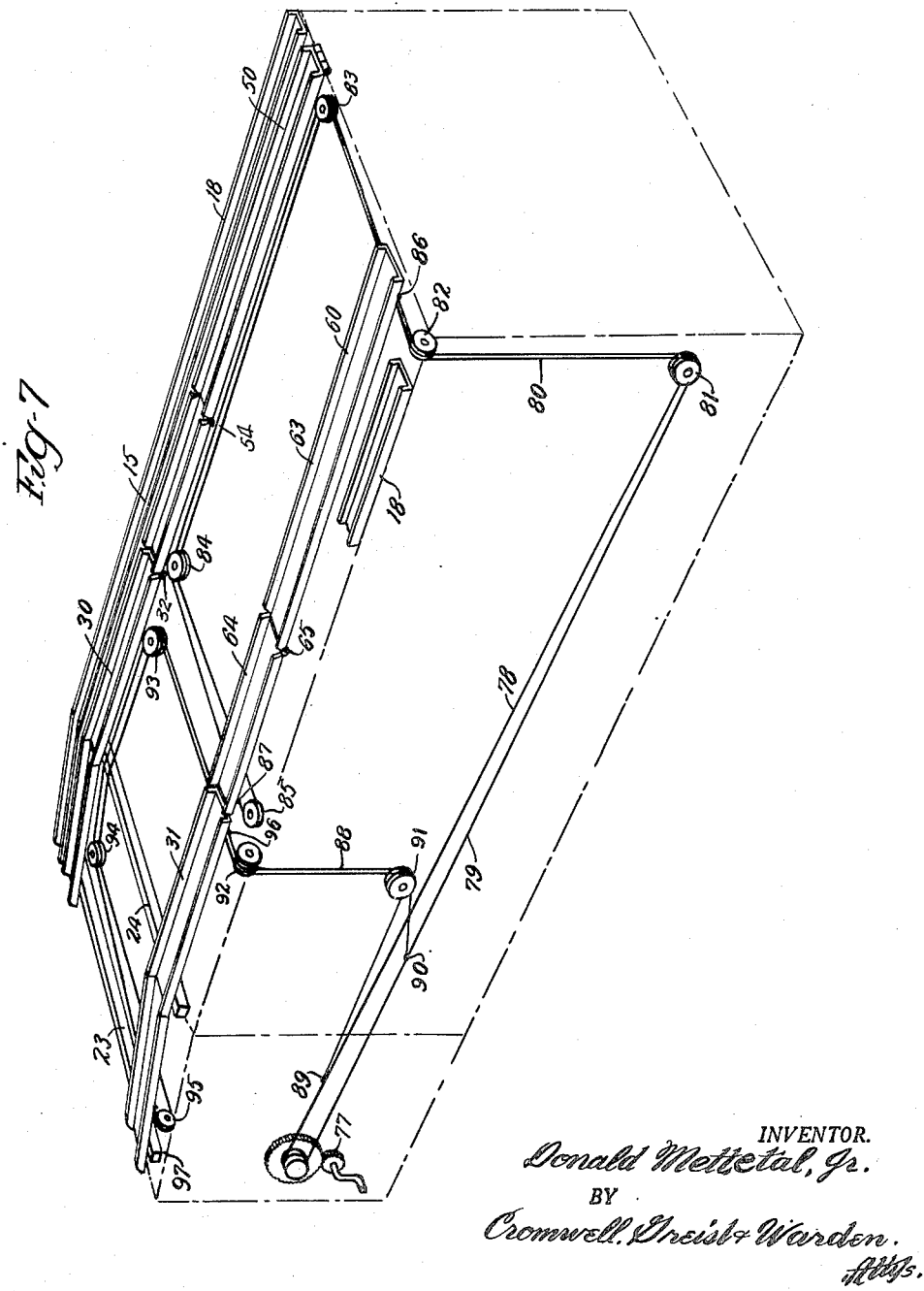

Patented Sept. 22, 1953

2,653,049

UNITED STATES PATENT OFFICE 2,653,049

AUTOMOBILE TRANSPORTING VEHICLE WITH ADJUSTABLE TRACK

Donald Mettetal, Jr., Chicago, Ill., assignor to Truck Service, Inc., Chicago, Ill., a corporation of Illinois Application December 22, 1950, Serial No. 202,289

13 Claims. (Cl. 296—1)

This invention is concerned with improvements in a vehicle of the type particularly adapted for transporting a plurality of other vehicles arranged in nested relation thereon.

It is a general object of the invention to provide a motor vehicle transport of the double-deck type which is provided with a deck structure having a portion thereof movably mounted whereby the vehicle may be employed to transport a plurality of other vehicles of conventional size such as ordinary passenger automobiles or a greater number of vehicles of a smaller size.

It is a further object of the invention to provide a double-deck type vehicle transport in which wheel supporting tracks are arranged on the upper deck having movably mounted members so that there may be arranged thereon a single line of vehicles of conventional size or a double line of vehicles of smaller size.

It is another object of the invention to provide a double-deck type automobile transport vehicle in which the deck structure on the upper deck is constructed so that it can be arranged either in the position required to support a single line of three automobiles of conventional size or in a position to support a double line of three automobiles of the smaller size.

It is another object of the invention to provide in a double-deck automobile transporting vehicle an upper track structure having movable sections which are controlled by a single operating device to position the same for receiving a single line of automobiles of the ordinary size or a double line of automobiles of the smaller size.

It is a further object of the invention to provide a double-deck automobile transport vehicle in which the track for receiving and supporting the cars on the upper deck is arranged with movable sections and a winch operated cable is connected to certain of the track sections to move the same simultaneously whereby to position them for supporting automobiles of conventional type or of the smaller type as desired.

These and other objects of the invention will be apparent from a consideration of the vehicle shown in the drawings, wherein:

Fig. 1 is a plan view of a motor vehicle transport illustrating the principles of the invention, the track on the top deck being arranged for loading thereon three passenger automobiles of conventional size;

Fig. 2 is a plan view of the transport with the track on the upper deck arranged for loading thereon two lines of automobiles of the smaller size;

Fig. 3 is a side elevation of the transport with the smaller size automobiles shown thereon in outline;

Figs. 4, 5 and 6 are detail sections, to an enlarged scale, showing portions of the movable track sections; and Fig. 7 is a perspective view largely schematic showing the cable arrangement for adjusting the movable track sections on the upper deck.

Vehicles which are generally provided for transporting automobiles are arranged to accommodate a predetermined number of automobiles of conventional size within certain base limits which are determined by road conditions and by the regulations of the states in which the vehicle is designed to operate. Vehicles of this type which are avaliable ordinarily accommodate four automobiles of conventional size arranged two on a lower deck and two on an upper deck. The track structure which supports the vehicles while they are in transport is generally fixed relative to the frame of the transporting vehicle or is movable only in a vertical direction to facilitate loading of the two decks.

When using the conventional type of double-deck automobile transporting device for hauling automobiles of a different size from the conventional automobile or for hauling other vehicles such as tractors which are different in size from the conventional vehicle, being shorter and generally narrower, considerable wasted space is apparent because of the smaller size of the vehicle being carried. However, it has been the practice to use the ordinary transporting vehicle for hauling these odd size vehicles without regard to the loss of space. This results in a disproportionate cost for handling the small vehicles which are generally lower priced.

The present invention is designed to reduce the cost of hauling small type vehicles by providing a transporting vehicle which is adapted to haul a larger number of the small vehicles. The vehicle is so designed that it will haul a substantial number of cars of conventional size or it may be converted to hauling a larger number of vehicles of smaller size without destroying its usefulness as a carrier for vehicles of conventional size.

Referring now to the drawings, there is illustrated a trailer type vehicle transport for hauling a plurality of automobiles in nested relation thereon which incorporates therein the principles of the invention. It will be understood that the particular type of small vehicle illustrated in connection with the description of the invention is taken as an example and that the transporting vehicle is not limited to the hauling of this particular vehicle but is useful for hauling small cars of a different type or small tractors or other small sized vehicles of a similar character.

In the illustrated form of the device a conventional arrangement of structural frame members is employed to provide a trailer body 10 which is supported at the rear on a wheel structure 11. At the front the body structure is recessed and a connecting pin 12 is provided for securing the trailer to a motor truck (not shown) by means of which the trailer is drawn.

The body 10 includes side frames 13, a bottom automobile supporting structure 14 and a top or upper deck automobile supporting structure 15. The side frame members 13 consist of vertically spaced horizontally extending structural members 16, 17 and 18 and a series of longitudinally spaced connecting vertical members or posts 19. A forward cross frame 20 provides additional reinforcing strength at the front end of the trailer body.

The bottom 14 of the trailer is provided with a rear ramp or track supporting structure 21 which extends from the rear end of the vehicle, over the rear wheel structure 11, toward the center of the bottom 14 and also with a forward ramp or track supporting structure 22 which extends from adjacent the center of the bottom 14 up over the forward portion thereof.

The top or upper deck structure 15 of the trailer includes the top side frame members 18 at opposite sides, transversely extending rear and intermediate cross bars 23, 24, 25, 26, 27 and the top member 28 of the front cross frame 20 at the forward portion of the body 10. The longitudinal top side frame members 18 are generally U-shaped in cross section with the open side extending upwardly. They extend horizontally of the trailer with portions sloping somewhat toward the rearward end thereof. The upper deck also includes wheel carrying track structure having movable and fixed sections or members.

The rear track structure of the upper deck includes two channel-like upwardly opening track members 30 and 31. The track member or section 30 is relatively narrow while the track section 31 is somewhat wider. The track section 30 is pivoted at its forward end at 32 to the cross bar 25 with its rearward end resting on and secured to the cross bar 23. The track section 30 is also secured to intermediate cross bar 24. Both cross bars 23 and 24 are seated at their ends in recesses or pockets provided in the side frames 13 adjacent the tops thereof. Both cross bars 23 and 24 move with the track section 30 when the same is swung upwardly about pivot 32 to permit the loading of automobiles on the lower deck.

The track section 31 is arranged for lateral movement in parallel relation toward and from the track section 30. At its forward end it is supported on a cross frame member 33 which forms a portion of a counterbalancing structure 33', the end of the track section 31 resting on the rearmost cross member 34 of the frame 33' and being guided in its lateral movement by connection with a U-shaped bar 35 which is secured at the ends of its relatively short legs to the cross bar 34 by pivots 36 and 37. The cross bar 35 extends through slots 38 provided in the side plates 39 on the channel-shaped track section 31 (Figs. 1 and 5). The track section 31 is also guided in its lateral movement by connection with a U-shaped guide rod 40 having the ends of its relatively short legs connected in fixed relation to the intermediate cross bar 24 and being slidably connected with the track section 31 by means of a depending eye member 41 which is secured to the bottom of the track section 31. The track section 31 rests on the cross bar 23 at its rear end and is guided thereon in its lateral movement by means of a U-shaped guide rod 42 having the ends of its legs fixed to the end cross bar 23 and being slidably connected with the track section 31 by a depending eye member 43. The track section 31 may be rigidly secured when in adjusted position by means of toggle locking members indicated at 44 (Figs. 1 and 6) at the rear end and at 45 (Figs. 1 and 5) at the front end which are pivotally secured to the track section and engage in clamping relation with the cross bar 23 and the frame member 33, respectively.

The track section 31 is arranged to be elevated relative to the cross frame bar 34, as in Fig. 5 and to be held in the elevated position by upward swinging movement of the rod 35 about its pivot points 36 and 37. L-shaped locking plates 46 are attached to the cross member 34 at the pivot point 37 and a locking pin 47 is provided for cooperation therewith. The locking plates 46 have apertures in the ends of the legs thereof which align with an aperture in a plate 48 which forms one leg of the U-shaped cross bar 35, when the bar 35 is in either down or up position, and receive the locking pin 47 for securing the bar 35.

Two forward or front track formations 49 and 50 are provided which align with rear track section 30. The forward section 49 is rigidly mounted at opposite ends on top of the cross frame bar 27 and the cross frame member 28. The track formation 50 is pivotally mounted at 51 on the cross frame member 27 and rests on the intermediate cross frame member 25 at the other end. The track formation 50 is made in two sections 52 and 53 which are pivoted to each other at 54, immediately above the cross frame member 26.

On the other side of the vehicle at the forward end a fixed track section 55 similar to the track section 49 is rigidly secured on the cross bar 27 and on top of the cross frame member 28. This section remains in position in the same manner as the track section 49 and is used during the carrying of larger size cars.

A removable or movable track section 56 is provided intermediate the two forward track sections 49 and 55. The removable track 56 is pivotally connected to the forward frame member 28 by means of cooperating spaced ears 57 having aligned hinge apertures and a removable pin 58. The rear of the track member 56 rests on a cross bar 59 which is supported between the track members 49 and 55. The track member 56 may be completely removed or pivoted into a forward upward position about the pivot pin 58 as desired.

A laterally movable track formation 60 is provided to extend between the fixed track formation 55 and the center cross bar 25. The forward end of the track 60 is provided with a downwardly projecting eye 61 which receives a rigid cross bar 62 which is mounted above the cross frame member 27 to permit the track 60 to move laterally. The track formation 60 is made in two sections 63 and 64 which are pivoted at 65 to each other. The rear end of the section 64 extends to the cross bar 25 and rests on the top of the same.

The cross frame member 26 constitutes part of the counterbalancing frame 33 and extends between side members or legs 66 which are arranged lengthwise of the vehicle and pivoted to the side frame members at 67. The side frame members 66 extend rearwardly of the pivots 67 and are pivotally connected at 68 to side frame members 69 which carry the cross member 34 extending beneath the rear track formations 30 and 31. The cross frame members which are connected by the side links 66 and 69 support or connect the front and rear track formations so that when the rear track formations are elevated the sectional front track formations are also elevated at the hinge or pivot points 54 and 65. The cross bar 26 is elevated upon movement of the rear track formations 30 and 31 about the pivot point 32 due to the connections with the cross frame 33'.

In order to elevate the track formation 60 and bring it level with the top side frame members 18 when it is desired to carry the smaller cars a swinging U-shaped frame member 70 is provided on the cross bar 26 with its legs pivoted at 71 to the cross bar 26 so that it may be swung into an upward position to support the track above the cross bar 26 without elevating the cross bar 26 as required when the track is raised to permit loading of the lower deck. A pivoted latching bolt 72 is provided on the track section 63 for latching engagement in a slot provided in frame member 70 or cross bar 26 to permit latching of the track in either the up or down position.

A relatively wide plate 73 is provided at the center cross bar 25 having side or end arms 74 which are pivotally mounted at 75 on the cross bar 25. The plate 73 is adapted to pivot about the points 75 into an upright position above the bar 25 and support thereon the ends of the track sections 31 and 64 during movement of the track sections laterally of the vehicle and also during the loading of the smaller cars on the upper deck. A pivoted latching bolt 76 is provided on the track section 64 for securing the same in latching engagement in a slot provided in the plate 73 or the cross bar 25 in elevated or lowered position.

The track sections 60 and 31 are controlled for lateral movement by means of a set of cable members and fixed pulleys. The arrangement of the cables and pulleys is illustrated particularly in Fig. 7. A hand operated power winch indicated at 77 at the rear of the vehicle controls the operation of the cables. The winch 77 is of conventional construction and will not be described. The winch 77 receives portions of the cable system indicated at 78 and 79 with several turns being taken about the drum of the winch 77. The cable portions 78 and 79 which extend lengthwise of the vehicle constitute part of a continuous cable member which is looped or doubled to form advance and return runs or sections which are supported on or trained around pairs of intermediate guide pulleys 81, 82, 83, 84 and a terminal pulley 85, all of which are journaled on convenient portions of the vehicle body 10. The cable 80 is secured at 86 and 87 to the track formation 60 at opposite ends of the latter so that upon rotation of the winch 77 the cable 80 will move the track 60 toward or from the track 50. A continuous cable member 88 of the same character as cable 80 has its ends connected at 89 and 90 to the end portions 78 and 79 of the cable 80 and is supported or intermediate pairs of guide pulleys 91, 92, 93, 94 and terminal pulley 95, all of which are also journaled on the vehicle body 10. The cable 88 is secured at 96 and 97 to the opposite ends of the movably mounted track formation 31 so that upon rotation of the winch 77 the track 31 will be moved toward and from the track 30 simultaneously with the movement of track 60.

In operation track members 30 and 31, together with the attached cross frame members 23 and 24 are swung upwardly about pivot 32 the required distance to permit loading of the vehicles being hauled on the lower deck 14. This pivoting movement also raises the two section tracks 50 and 60 at the hinge points 54 and 65 to provide adequate clearance for loading the lower deck, through operation of the frame 33' which is latched to the track section 31 and swings the forward end of frame 33' to move connecting pivot 86 downwardly, sufficient to swing arm 66 about pivot 67 which raises cross bar 26. Thereafter the upper track formations are returned to the lowered position and further adjustments of the tracks on the upper deck are made, depending upon whether large or small vehicles are being loaded thereon. If large vehicles are being loaded the track is arranged as in Fig. 1 for receiving two large vehicles, the wheels of the vehicles being supported at one side of the carrier by the track formations 30, 50 and 49 and at the other side of the carrier by the track formations 31, 60 and 55. If small vehicles are being loaded, the tracks 31 and 60 are moved by the operation of winch 77 and cables 80 and 88 to the position shown in Fig. 2 in longitudinal alignment with the track member 56 so that the inside wheels of two parallel rows of small vehicles will be supported by the tracks 31, 60 and 56 in the center of the carrier. The tracks 31 and 60 are also elevated to the level of the top side frame members 18 which support the outside wheels of the vehicle being carried. Elevation of track 31 is accomplished by pivoting the cross bar 35 upwardly above the frame member 34 and latching it in elevated position with the pin 47. Supporting plate 73 is swung upwardly above cross bar 25 to support in elevated position the inner ends of tracks 31 and 60, the tracks being secured thereto by latch bolts 45 and 76. Supporting bar 70 is also swung upwardly to raise the track 60 at the hinge 65 being urged upwardly by the tension spring 100 which is secured at opposite ends to the carrier body 10 and the cross bar 70. The track section 63 is also urged upwardly by a leaf spring 101 arranged at the other end.

The mounting of the tracks is such that they may be adjusted to quickly convert the carrier from the hauling of vehicles of conventional size to the hauling of the smaller size vehicles by relatively simple adjustments.

It is possible to adjust the laterally movable track 31 so that the large type vehicles can be supported with the inner wheels on track 31 and the outer wheels on track 18, it being preferable, of course, to support the outer wheels of the larger vehicles on the track 30 in order to center the load on the vehicle.

While specific details of construction have been referred to in describing the illustrated vehicle, it will be understood that other details of construction may be resorted to within the spirit of the invention.

I claim:

1. In a vehicle for transporting other vehicles, a generally elongate vehicle body frame having arranged thereon a lower deck structure and an upper deck structure for receiving vehicles to be transported thereon, said body frame including top side members having upwardly opening wheel receiving track formations on the upper side thereof which form part of the upper deck structure, laterally fixed horizontally extending wheel receiving track forming members arranged adjacent one of said upper side frame members, laterally movable track forming members arranged between said fixed track forming members and the other one of said upper side frame members and means for selectively positioning said movable track forming members relative to said top side frame members and said fixed track forming members whereby either a single line of vehicles of normal width may be supported on the fixed and movable track forming members or a double line of vehicles of less than normal width may be supported on the top side frame members and the movable track forming members.

2. In a vehicle for transporting other vehicles, a generally elongate vehicle body frame having arranged thereon a lower deck structure and an upper deck structure for receiving vehicles to be transported thereon, said body frame including top side members having upwardly opening wheel receiving track formations on the upper side thereof which form part of the upper deck structure, laterally fixed horizontally extending wheel receiving track forming members arranged adjacent one of said upper side frame members, laterally movable track forming members arranged between said fixed track forming members and the other one of said upper side frame members and means including and endless cable secured to said movable track forming members for positioning said movable track forming members either adjacent the other of said top side frame members or centrally of the vehicle whereby either a single line of vehicles of normal width may be supported on the fixed and movable track forming members or a double line of vehicles of less than normal width may be supported on the top side frame members and the movable track forming members.

3. In a vehicle for transporting other vehicles, a generally elongate vehicle body frame having arranged thereon a lower deck structure and an upper deck structure for receiving vehicles to be transported thereon, said body frame including top side members having wheel receiving track formations on the upper side thereof which form part of the upper deck structure, laterally fixed horizontally extending wheel receiving track forming members arranged adjacent one of said upper side frame members, laterally movable track forming members arranged between said fixed track forming members and the other one of said upper side frame members and adjusting means secured to said movable track forming members for positioning said movable track forming members either adjacent the other one of said top side frame members or centrally of said top side frame members whereby either a single line of vehicles of conventional width may be supported on the fixed and movable track forming members or a double line of vehicles of less than conventional width may be supported on the top side frame members and the movable track forming members.

4. In a double deck vehicle transport having a vehicle frame structure with upper side frame members forming fixed wheel receiving tracks, cross bar members connecting said side frame members, two longitudinally extending wheel receiving track formations arranged on said cross bar members between said upper side frame members, said track formations each comprising a plurality of longitudinally aligned sections, the forward sections of both of said track formations being fixed on forward cross bar members adjacent said upper side rail members, a track section of substantially the same length as said forward sections removably mounted intermediate the same, and one of said track formations comprising intermediate and rearward sections which are mounted for lateral movement, the forward track sections of both said track formations being movable vertically to permit greater vertical clearance while the lower deck is being loaded and means for moving said movable track sections to align said movable sections approximately in the longitudinal center of the vehicle.

5. In a double deck vehicle transport having side frame members and top cross bars, said side frame members including top members having wheel supporting tracks extending longitudinally of the vehicle, cross bar members connecting said top side frame members, longitudinally extending wheel supporting track formations supported on said cross bar members between said side frame members, said track formations comprising forward sections pivotally connected to an intermediate cross bar member to permit simultaneous vertical movement of said track sections and one of said track formations being movably mounted on said cross bar members for adjustment transversely of the vehicle relative to the other one of said track formations.

6. In a double deck vehicle transport having side frame members and top cross bars, said side frame members including top members having wheel supporting tracks extending longitudinally of the vehicle, cross bar members connecting said top side frame members, longitudinally extending wheel supporting track formations supported on said cross bar members between said side frame members, said track formations comprising a plurality of articulated sections, one of said sections being pivotally connected to an intermediate cross bar member to permit vertical adjustment of said track formations and one of said track formations being movably mounted on said cross bar members for adjustment transversely of the vehicle relative to the other one of said track formations.

7. In a double deck vehicle transport having side frame members and top cross bars, said side frame members including top members having wheel supporting tracks extending longitudinally of the vehicle, cross bar members connecting said top side frame members, longitudinally extending wheel supporting track formations supported on said cross bar members between said side frame members, said track formations comprising forward sections pivotally connected to an intermediate cross bar member to permit simultaneous vertical movement of said track sections, said track formations comprising articulated intermediate sections, a pivoted counterbalancing cross frame connecting said forward and intermediate sections whereby vertical movement of said forward sections is transmitted through said cross frame to said intermediate sections and the sections of one of said track formations being movably mounted on said cross bar members for adjustment transversely of the vehicle relative to the other of said track formations.

8. In a vehicle for transporting other vehicles, a generally elongate vehicle body frame having arranged thereon a lower deck structure and an upper deck structure, said body frame including top side members having wheel receiving track formations on the upper side thereof which form part of the upper deck structure, laterally fixed horizontally extending wheel receiving track forming members arranged in longitudinal alignment adjacent one of said upper side frame members, laterally movable track forming members arranged for movement between said upper side frame members, means for selectively moving said movable track forming members, means for securing said movable track forming members either adjacent the other top side frame member or centrally of the vehicle whereby either a single line of vehicles of normal width may be supported on the fixed and movable track forming members or a double line of vehicles of less than normal width may be supported on the top side frame members and the movable track forming members.

9. In a double deck vehicle transport having a vehicle frame structure with upper side rail members forming fixed wheel receiving tracks, cross bar members connecting said side rail members, two longitudinally extending wheel receiving track formations arranged on said cross bar members between said upper side rail members, said track formations each comprising separate longitudinally aligned sections, the forward sections of each of said track formations being fixed on forward cross bar members adjacent said upper side rail members, a track section of the same length as said forward sections adjustably mounted intermediate the same, said track formations comprising intermediate and rearward sections which are relatively movable laterally and which are connected for movement vertically to permit greater vertical clearance while the lower deck is being loaded and means for moving said movable sections relative to the fixed sections to align said movable sections approximately in the longitudinal center of the vehicle.

10. In a vehicle for transporting other vehicles, a vehicle body frame providing vertically spaced upper and lower deck structures, wheel supporting track formations on the lower deck structure for receiving thereon in longitudinal alignment a plurality of vehicles to be transported, and wheel supporting track formations on the upper deck structure for receiving thereon in either single row or double row relation a plurality of other vehicles to be transported, said track formations on said upper deck comprising transversely spaced sections forming at least three longitudinally extending wheel supporting tracks for receiving the vehicle wheels, and one of said tracks intermediate the other two of said tracks being of sufficient width to support the inner wheels of two vehicles when they are arranged in side-by-side relation on said deck structure and being adjustably mounted for movement laterally of the vehicle body frame.

11. In a vehicle for transporting other vehicles, a vehicle body frame providing vertically spaced upper and lower decks, wheel supporting track structure on the lower deck for receiving thereon a plurality of vehicles to be transported, and wheel supporting track structure on the upper deck for receiving thereon in either single or double row relation a plurality of other vehicles to be transported, said upper deck track structure having longitudinally extending fixed and movable sections extending lengthwise of the vehicle and forming four wheel receiving tracks, said movable sections forming one of said tracks and being of sufficient width to support the juxtaposed wheels of two vehicles arranged on said upper deck in double row relation, and means mounting said movable sections for adjustment relative to the fixed sections and laterally of the vehicle body frame whereby a single line of vehicles of normal width may be accommodated thereon or a double line of substantially smaller width may be accommodated thereon.

12. In a vehicle for transporting other vehicles, a vehicle body frame providing vertically spaced upper and lower decks, wheel supporting means arranged lengthwise of the vehicle on the lower deck for receiving thereon a plurality of vehicles to be transported and wheel supporting track structure on the upper deck for receiving thereon in either single or double row relation a plurality of other vehicles to be transported, said last mentioned track structure being arranged longitudinally of the vehicle and having longitudinally aligned sections providing a central movable wheel supporting track and outer fixed wheel supporting tracks, means mounting said central wheel supporting track for movement laterally of the vehicle body frame to selectively position said central wheel supporting track relative to said fixed wheel supporting tracks for supporting thereon the wheels on one side of a single line of vehicles of conventional width or the wheels on adjacent sides of a double line of vehicles of less than conventional width.

13. In a vehicle for transporting other vehicles, a vehicle body frame providing vertically spaced upper and lower decks, wheel supporting means on the lower deck for receiving thereon a plurality of vehicles to be transported, and wheel supporting means on the upper deck for receiving thereon in either single or double row relation a plurality of other vehicles to be transported, said last mentioned means comprising a plurality of track sections thereon forming at least three transversely spaced wheel supporting tracks, two of said tracks having longitudinally extending articulated members, and means mounting portions of one of said tracks for adjustable movement laterally of the vehicle body frame, whereby a single line of vehicles of conventional width may be carried thereon or a double line of vehicles of substantially less than normal width may be carried thereon.

DONALD METTETAL, Jr.

References Cited in the file of this patent

UNITED STATES PATENTS

| Number | Name | Date |
|---|---|---|
| 2,123,630 | Judd | July 12, 1938 |
| 2,567,100 | Carey | Sept. 4, 1951 |